(12) United States Patent
Dahlenburg

(10) Patent No.: US 10,442,261 B2
(45) Date of Patent: Oct. 15, 2019

(54) TRAILER HITCH COUPLER

(71) Applicant: Darrin Dahlenburg, Theodore, AL (US)

(72) Inventor: Darrin Dahlenburg, Theodore, AL (US)

( * ) Notice: Subject to any disclaimer, the term of this patent is extended or adjusted under 35 U.S.C. 154(b) by 0 days.

(21) Appl. No.: 15/695,197

(22) Filed: Sep. 5, 2017

(65) Prior Publication Data

US 2017/0361669 A1    Dec. 21, 2017

Related U.S. Application Data

(63) Continuation of application No. 14/991,098, filed on Jan. 8, 2016, now Pat. No. 9,751,369.

(60) Provisional application No. 62/102,291, filed on Jan. 12, 2015.

(51) Int. Cl.
*B60D 1/06* (2006.01)
*B60D 1/36* (2006.01)

(52) U.S. Cl.
CPC ............... *B60D 1/363* (2013.01); *B60D 1/06* (2013.01)

(58) Field of Classification Search
CPC .................................. B60D 1/363; B60D 1/06
See application file for complete search history.

(56) References Cited

U.S. PATENT DOCUMENTS

| 3,658,363 | A | * | 4/1972 | Marler | B60D 1/065 280/511 |
|---|---|---|---|---|---|
| 5,205,666 | A | * | 4/1993 | Hollis | B60D 1/065 280/512 |
| 5,997,025 | A | * | 12/1999 | Wisecarver | B60D 1/00 280/508 |

* cited by examiner

*Primary Examiner* — Kevin Hurley
*Assistant Examiner* — Marlon A Arce
(74) *Attorney, Agent, or Firm* — Lanier Ford Shaver & Payne, PC; Jeremy A. Smith

(57) ABSTRACT

This application provides an improved trailer hitch coupler comprising a trailer tongue having a recessed portion, said recessed portion having a recessed portion front and recessed portion back wall; a moveable base plate inside the tongue recessed portion; a cavity spring positioned in the tongue recessed portion and biasing the base plate toward the recessed portion front; and coupler arms connected to the base plate at a pivot point, whereby the coupler arms rotate around the pivot point to open and closed positions.

3 Claims, 4 Drawing Sheets

TRAILER HITCH COUPLER

CROSS REFERENCE TO RELATED APPLICATIONS

This application claims priority to, and the benefit of, U.S. patent application Ser. No. 14/991,098 (now U.S. Pat. No. 9,751,369) filed on Jan. 8, 2016, which in turn claimed priority to, and the benefit of, U.S. Provisional Patent Application No. 62/102,291 filed on Jan. 12, 2015.

FIELD OF THE INVENTION

The invention relates generally to an improved coupler for a trailer hitch and more specifically relates to an improved trailer hitch coupler with moveable arms which provide ease of coupling without requiring precise alignment between the towing vehicle and the trailer.

BACKGROUND ART

As used herein, the term "trailer" is used in a broad sense to describe unpowered vehicles that are towed by a separately powered vehicle. Commonly used trailers include utility trailers (often ranging from 4×6 to 10×20), boat trailers, campers, etc. Conventionally, the towing vehicle will include a hitch, secured to the frame of the towing vehicle, that includes a ball head, although other configurations are known. The trailer will include a coupler to placed over the ball head (or other configuration) and secured in place.

However, many trailers can be very heavy and difficult to maneuver by hand. Thus, the towing vehicle must be accurately, and precisely, position against the trailer to hook the trailer up to the towing vehicle. The hitch itself is often out of the drivers view while in the towing vehicle. Thus, assistance from someone outside of the towing vehicle is needed, or the driver must get out of the towing vehicle, check the position, and get back into the towing vehicle multiple times, a time consuming and potentially dangerous process. What is needed is trailer hitch coupler that provides an easier coupling between the trailer and hitch, and provides a secure attachment to the towing vehicle.

SUMMARY OF THE INVENTION

In view of the foregoing disadvantages inherent in the conventional type of methods and systems now present in the prior art, the present invention provides an improved trailer hitch coupler. Because the predominant trailer hitch is the ball head hitch, the specification describes the preferred embodiment configured to receive and secure to a ball hitch. However, those of skill in the art will recognize that invention can also be used with other hitch configurations.

In one embodiment, the invention comprises a trailer tongue having a recessed portion forming a cavity, a cavity spring forward biasing a base plate, with movable coupler arms attached to the base plate, which can extend to an open position to receive a ball hitch, and when in a closed position around the ball hitch, can move into the recessed portion.

In some embodiments, a locking arm can be used, with or without locking arm springs, that can engage a saddle in the coupler arms to lock the coupler arms in a closed position, and recessed into the recessed portion of the trailer tongue.

When the coupler arms are in their open position, it provides a much larger target area for the hitch, and when closed provides a secure connection to the towing vehicle.

Other objects and advantages of the present invention will become obvious to the reader and it is intended that these objects and advantages are within the scope of the present invention.

To the accomplishment of the above and related objects, this invention may be embodied in the form illustrated in the accompanying drawings/pictures, recognizing however, that the drawings are illustrative only, and that changes may be made in the specific construction illustrated and described within the scope of the appended claims.

BRIEF DESCRIPTION OF DRAWINGS

It should be noted that identical features in different drawings are shown with the same reference numeral. Various other objects, features and attendant advantages of the present invention will become fully appreciated as the same becomes better understood when considered in conjunction with the accompanying drawings.

DETAILED DESCRIPTION

Figure 1:
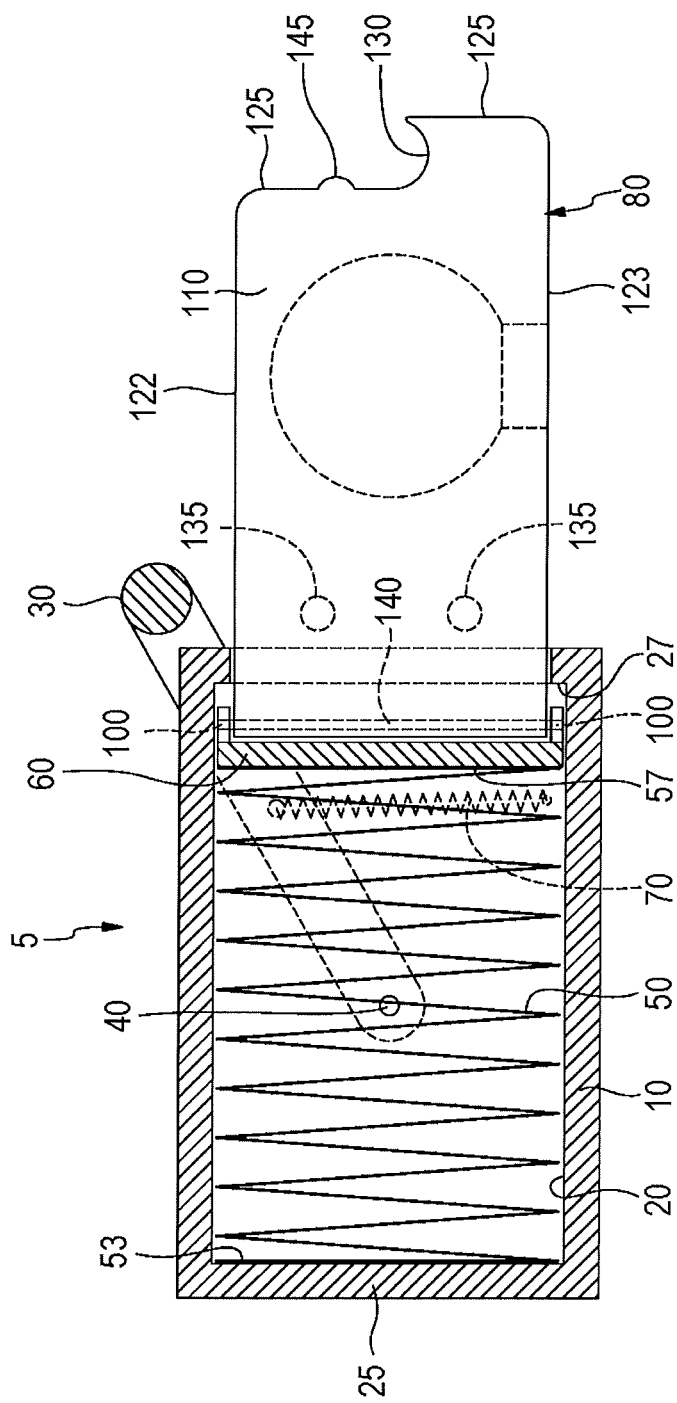
FIG. 1 is a cut away side view of one embodiment of the trailer hitch coupler.

The following component parts (with designations), that may be found, or used, in various embodiments of the present invention, include:
Trailer hitch coupler 5
Trailer tongue 10
Tongue recessed portion 20
Recessed portion back wall 25
Recessed portion front 27
Locking arm 30
Locking arm pivot point 40
Cavity spring 50
Cavity spring rear 53
Cavity spring front 57
Base plate 60
Locking arm spring 70
Moveable coupler arms 80
Ball recessed portion 90
Coupler arms pivot point 100
Coupler arm outer face 110
Coupler arm inner face 120
Coupler arm top face 122
Coupler arm bottom face 123
Coupler arm front edge 125
Saddle 130
Coupler arm opening spring 135
Coupler arm/base plate connector pin 140
Locking lip 145
Base plate extension 150

FIGS. 1 through 4 illustrate various views and embodiments of the present invention. In one embodiment of the trailer hitch coupler 5, shown in FIG. 1, a trailer tongue 10 is provided. The trailer tongue 10 can be manufactured as part of the trailer itself, or as a separate attachment to be added to existing trailers. As discussed above, common trailers include utility trailers, boat trailers, campers, etc. The trailer tongue 10 of FIG. 1 has a recessed portion 20 forming a cavity on the inside of the trailer tongue 10. The trailer tongue 10 and the recessed portion 20 can be of various configurations, but preferably is rectangular or square in cross-section, as most traditional trailer tongues.

In the embodiment shown in FIG. 1, inside the recessed portion 20 is a cavity spring 50. The cavity spring rear 53 is secured inside the recessed portion 20, for example, pressed against the recessed portion back wall 25 inside the recessed portion 20, or against flanges inside the recessed portion 20 (not shown). The cavity spring front 57 interfaces with a base plate 60, the cavity spring 50 biased, and pushing the base plate 60 toward, the recessed portion front 27. The recessed portion front 27 can have a lip or flanges to keep the base plate 60 inside the recessed portion 20. Thus, when not in use, the cavity spring 50 is biased such that the base plate 60 rests toward the recessed portion front 27, but the base plate 60 is compressible, against the cavity spring 50, into the recessed portion 20 (see FIG. 4). The base plate 60 is preferably of the same approximate, but slightly smaller, cross section as the recessed portion 20 so it can move freely inside the recessed portion 20.

Figure 2:
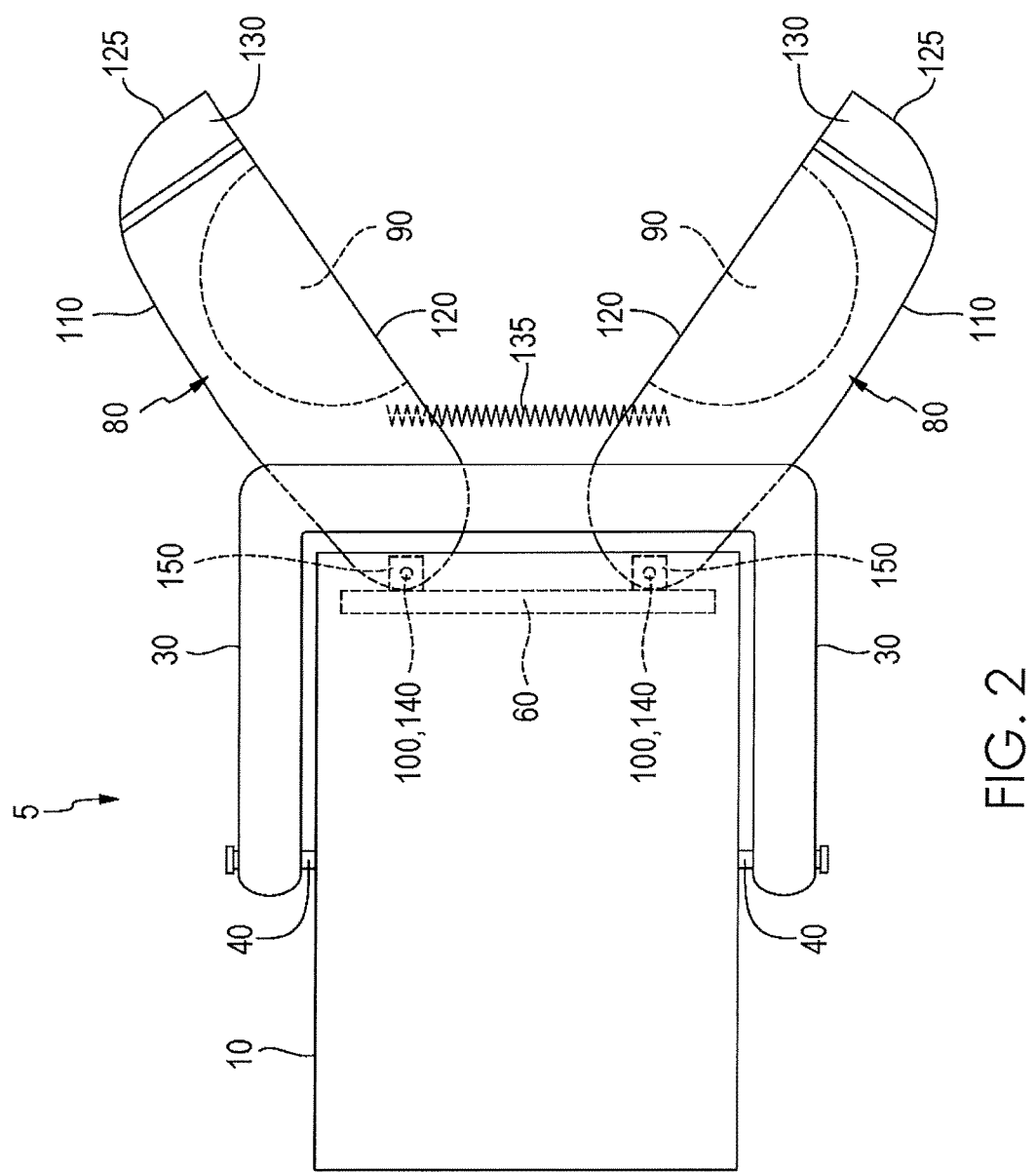
FIG. 2 is a top view of one embodiment of the trailer hitch coupler with the coupler arms in an open position.

Referring to FIGS. 1 and 2, the trailer hitch coupler 5 may also provide a locking arm 30 that can be secured to the trailer tongue 10 at locking arm pivot point 40. The locking arm 30 is moveable from open and closed positions, and pivots around the pivot point 40. The locking arm 30 can be secured at the pivot point 40 using any convention means, but should remain movable as described herein. The locking arm 30 moves generally in an arc in a vertical direction due to the secured pivot point 40.

Figure 3:
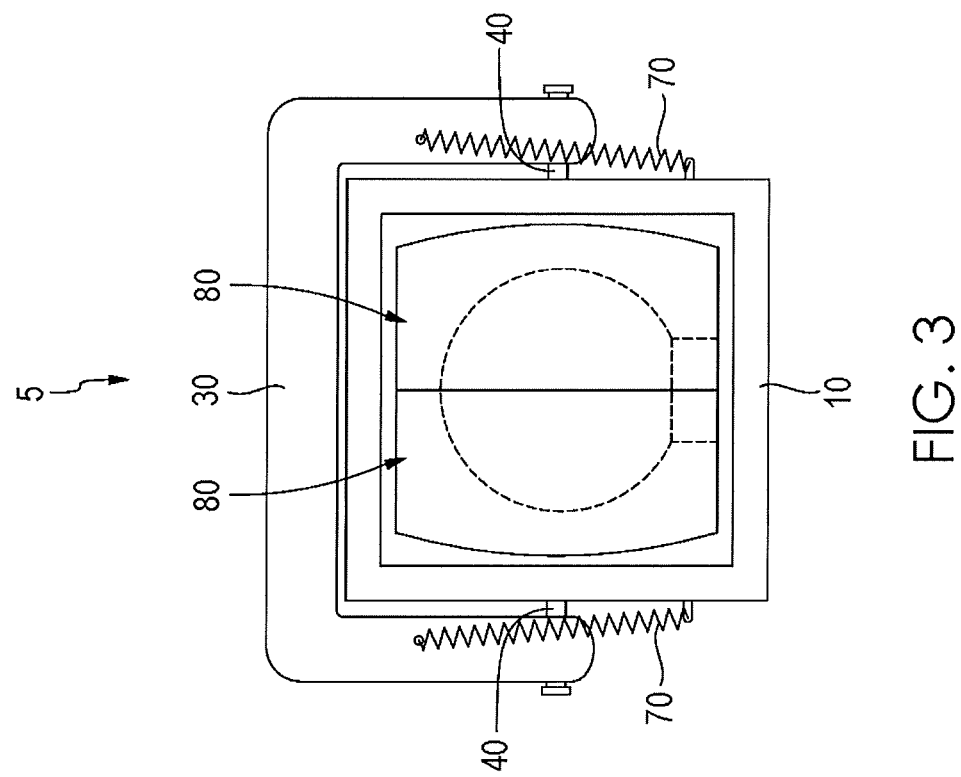
FIG. 3 is a front view of one embodiment of the trailer tongue without the coupler arms depicted.

Referring to FIGS. 1 and 3, in this embodiment, a locking arm spring 70 can be positioned on, and one end connected or secured to, the outer side face of the trailer tongue 10, preferably forward of the locking arm pivot point 40. The other end of the locking arm spring 70 is connected or secured to the locking arm 30. In some embodiments, no locking arm spring 70 is used. In another embodiment, a locking arm spring 70 is used on both sides of the trailer tongue 10 (as shown in FIG. 3). Preferably, the locking arm spring 70 is biased to pull the locking arm 30 in a downward position. However, the locking arm spring 70 should allow for a user to be able to pull the locking arm 30 upward without too much force. Additionally, the cavity spring 50 should be sized to exert more force on the base plate 60 (to push the base plate 60 and the coupler arms 80) forward than the force of the locking arm spring 70 pulling the locking arm 30 down. Thus, once the coupler arms 80 are unlocked or unlatched (as described further below), the preferred natural position is for the base plate 60 to rest against the recessed portion front 27, the coupler arms 80 extended in their open position, and the locking arm 30 resting against the coupler arm top face 122. This is due, in this embodiment, to the preferred downward bias of the locking arm spring 70.

Referring to FIGS. 1 and 2, the trailer hitch coupler 5 may also have moveable coupler arms 80 that are attached, via one or more pivot points 100 (e.g., pivot pins), to the base plate 60. In one embodiment shown in FIG. 2, the base plate 60 may have base plate extensions 150 extending outwardly from the base plate 60, and containing a hole or cavity. Preferably, the top and the bottom of the base plate 60 each have two (2) base plate extensions 150. The holes in the base plate extensions 150 can correspond to holes or channels in the coupler arms 80 such that a coupler arm/base plate connector pin 140 (or bolt, tube, or other securing mechanism) can be placed through the hole in the base plate extension 150 and holes/channels in the coupler arms 80, thus creating the pivot point 100. This allows the coupler arms 80 to move to and from an open position and closed position. The coupler arms 80 can also be spring biased such that the coupler arms 80 are in an open position when not in use by using an optional coupler arm opening spring 135 (see FIGS. 1 and 2). The coupler arms 80 have an outer face 110 and an inner face 120. The coupler arm inner face 120 may have a ball recessed portion 90, that are generally half a sphere configured and sized to receive a standard ball hitch. Standard ball hitches come in various sizes, so the ball recessed portion may be sized to accommodate anywhere from 1½", 1¾", 1⅞", 2", 2⁵⁄₁₆", or any other standard size. For other hitch configurations, the coupler arm inner face 120 may be configured and sized to receive other shapes. The coupler arms 80 may also have top face 122 that includes a cut-out over the ball recessed portion 90, or it may cover the ball recessed portion 90. The coupler arms 80 also have a bottom face 123 that may include a cut-out configured and sized to accommodate the shank of the trailer hitch ball assembly. Thus, many standard ball hitches use a 1" shank, and thus the coupler arm bottom face 123 could include a ½ inch, or slightly larger, half circle cut out of the coupler arm bottom face 123 to wrap around and secure to the hitch assembly, while still allowing the hitch assembly to rotate within the cut-out. The coupler aim front edge 125 may have a saddle 130 to receive the locking arm 30. The saddle 130 may be configured to have a locking lip 145 (see FIGS. 1 and 4) to engage or catch the locking all 130 to retain the locking arm 30 in place. The coupler arm front edge 125, or saddle 130 (if used), on one or both of the extension arms can also include a separate latch, clip, or lock to secure the locking arm 30 in place.

Figure 4:
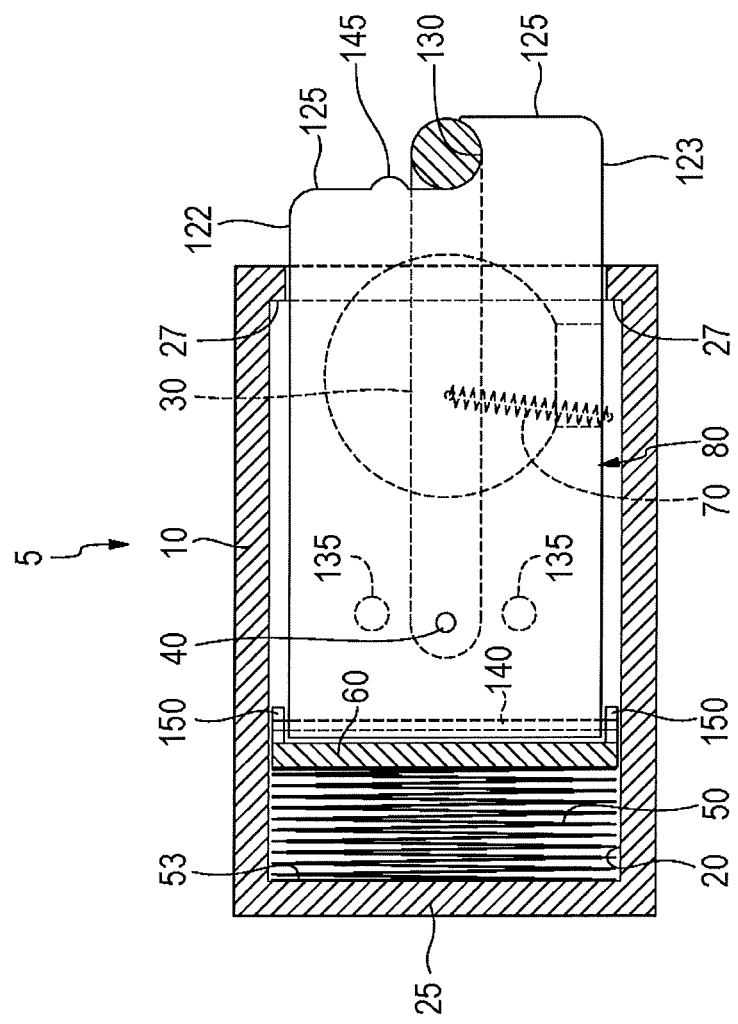
FIG. 4 is a side view of an embodiment of the trailer hitch coupler in a closed and locked position.

FIG. 4 depicts an embodiment of the trailer hitch coupler 5 in its closed and locked position. The cavity spring 50 has been compressed in the tongue recessed portion 20, the coupler arms 80 are in a closed position, and the majority of the coupler arms 80 positioned inside the tongue recessed portion 20. The coupler arm front edge 125 and saddle 130 extends outside of the recessed portion front 27, allowing the locking arm 30 to be moved or pulled into the saddle 130.

In practice, when not in use, the coupler arms 80 are preferably biased in an open position, and spread apart. In a preferred embodiment, the coupler aims 80 are spread apart forming an angle of between 40-90 degrees. The spread of the coupler arms 80 provides a wider target for the tow hitch. When a vehicle with a tow hitch is backed toward the open coupler arms 80, the coupler aims 80 force the ball hitch toward the base plate 60 resting against the recessed portion front 27. As the ball hitch engages the base plate 60, it compresses the cavity spring 50 into the recessed portion 20. As the base plate 60, and the attached coupler aims 80 move into the recessed portion 20, the side walls of the trailer tongue 10 force the coupler arms 80 to close around the hitch. The coupler arms 80 are sized such that in their closed position, they can slide into the recessed portion 20 of the trailer tongue 10 (e.g., the height of the coupler arms, measured from the bottom face to the top face, is less than the height of the tongue recessed portion front 27). The recessed portion 20 and cavity spring 50 are sized such that the base plate 60, and the majority of the coupler arms 80 slide back into the recessed portion 20, with the saddle 130 on the coupler arm front edge 125 extending out of the recessed portion 20. The locking arm 30 can be moved into the saddle 130 to keep the coupler arms 80 from sliding out of the recessed portion. The locking aim 30 and/or the coupler arms 80 can also use holes or recesses to receive conventional pins or locking mechanisms to secure in a particular position. For example, holes can be provided in the side walls of the trailer hitch coupler 5, and a pin or locking mechanism slid through the side wall, through the holes in the locking arm 30 or coupler arms 80, and out the other side of the side wall of the trailer hitch coupler 5. Additionally, a pin or locking mechanism can be used on holes in just the coupler arm front edge 125 that extend out of the recessed portion 20.

What is claimed is:

1. An improved trailer hitch coupler comprising:
   a. a trailer tongue having a recessed portion, said recessed portion having a recessed portion front and recessed portion back wall;
   b. a moveable base plate inside the tongue recessed portion;
   c. a cavity spring positioned in the tongue recessed portion and biasing the base plate toward the recessed portion front;
   d. coupler arms connected to the base plate at a pivot point, whereby the coupler arms rotate around the pivot point to open and closed positions;
   e. a moveable locking arm secured to the trailer tongue at a locking arm pivot point; and
   f. one or more locking arm springs having a first end portion and a second end portion, the first end portion connected to an outer side face of the trailer tongue and the second end portion connected to the movable locking arm.

2. The trailer hitch of claim 1, wherein the trailer tongue and the recessed portion is rectangular in cross-section.

3. The trailer hitch of claim 1, wherein the locking arm spring is biased to pull the locking arm in a downward position.

* * * * *